(12) United States Patent
Lee

(10) Patent No.: US 7,782,739 B2
(45) Date of Patent: Aug. 24, 2010

(54) METHOD FOR SETTING LASER POWER OF OPTICAL DISC DEVICE

(75) Inventor: Gab Jae Lee, Kyungsangnam-do (KR)

(73) Assignee: Hitchi-LG Data Storage Korea, Inc., Seoul (KR)

( * ) Notice: Subject to any disclaimer, the term of this patent is extended or adjusted under 35 U.S.C. 154(b) by 1042 days.

(21) Appl. No.: 11/441,174

(22) Filed: May 26, 2006

(65) Prior Publication Data
US 2006/0274615 A1    Dec. 7, 2006

(30) Foreign Application Priority Data
May 26, 2005  (KR) .................. 10-2005-0044368

(51) Int. Cl.
*G11B 7/00* (2006.01)
(52) U.S. Cl. .................................. 369/116
(58) Field of Classification Search ............ None
See application file for complete search history.

(56) References Cited

U.S. PATENT DOCUMENTS

| | | | | |
|---|---|---|---|---|
| 5,216,659 A | * | 6/1993 | Call et al. .............. 369/116 |
| 5,231,625 A | * | 7/1993 | Hokozono et al. ........ 369/116 |
| 5,390,160 A | * | 2/1995 | Sasaki .................. 369/53.12 |
| 5,392,273 A | * | 2/1995 | Masaki et al. ............ 369/106 |
| 2004/0052185 A1 | * | 3/2004 | Lehr et al. ............. 369/53.26 |
| 2004/0057651 A1 | * | 3/2004 | Lee ...................... 385/14 |
| 2005/0036434 A1 | * | 2/2005 | Lei ........................ 369/116 |
| 2006/0013091 A1 | * | 1/2006 | Matsuda ................ 369/53.1 |

* cited by examiner

*Primary Examiner*—Christopher R Lamb
(74) *Attorney, Agent, or Firm*—Birch, Stewart, Kolasch & Birch, LLP

(57) ABSTRACT

A method for setting laser power of an optical disc device is provided. It is determined whether or not power curve data is present in a memory. If no power curve data is present, laser power self-setting is performed, and detected power curve data is stored in the memory, and then the laser power is set using the stored power curve data. Even if no power curve data is present in the memory for a variety of reasons, it is possible to easily set an optimal laser power suitable for the characteristics of the optical disc device set, thereby securing a stable playback operation and guaranteeing high recording quality.

17 Claims, 4 Drawing Sheets

METHOD FOR SETTING LASER POWER OF OPTICAL DISC DEVICE

BACKGROUND OF THE INVENTION

1. Field of the Invention

The present invention relates to a method for setting laser power of an optical disc device, and more particularly to a method for setting laser power of an optical disc device in which power setting data is detected when no power setting data is present in the device and the laser power is set based on the detected power setting data.

2. Description of the Related Art

Optical disc devices require a variety of laser power levels according to their operating modes such as data recording and playback modes. Thus, typically, a laser power setting operation is performed for each optical disc device in the manufacturing process to detect and store data (power curve data) necessary for setting a laser power of each operating mode.

FIG. 1 illustrates a structure, associated with an optical disc device, for detecting power curve data required for laser power setting of the optical disc device. Generally, it is possible to set a desired laser power level by adjusting an input voltage DAC voltage applied to an R/F unit 50 in FIG. 1 through a D/A converter 40. The input voltage DAC and an output laser power P obtained therefrom are proportional to each other as represented by a line in FIG. 2 with an offset determined based on the characteristics of a laser diode and a laser drive IC in the optical disc device.

The laser power setting process includes a process for obtaining the relationship between the input voltage DAC and the output laser power, i.e., obtaining an equation of a line representing the relationship. A DAC_Offset value and a gradient of the line must be known in order to obtain the line equation. If a laser power P1 corresponding to a given input voltage DAC1 and the DAC_Offset value are known, it is possible to obtain the gradient of the line.

Accordingly, in the laser power setting operation performed in the manufacturing process of the optical disc device, the laser power P1 corresponding to the given input voltage DAC1 and the DAC_Offset value are detected, and the detected values are stored, as power curve data, in a memory (a flash ROM or an EEPROM) of the optical disc device. The following is a description of a conventional laser power setting operation for detecting the power curve data.

In the manufacturing process of the optical disc device, an operator or manager instructs activation of a laser power setting operation through a host so that a DAC_Offset value for laser power setting is detected and stored when the optical disc device enters a laser power setting mode. The DAC_Offset value is an input value applied to the D/A converter 40 at the moment when the R/F unit 50 produces an output voltage. When an X axis represents the DAC value and a Y axis represents the laser power or a feedback voltage level FPDO, the DAC_Offset value corresponds to an x-intercept of a first degree equation.

The DAC_Offset value can be detected using a first degree equation determined by specific input voltages DAC1 and DAC2, laser powers P1 and P2 output from or voltage levels FPDO1 and FPDO2 fed back from the optical pickup 60 receiving the input voltages DAC1 and DAC2. The following is an equation for detecting the DAC_Offset value using the input voltages DAC1 and DAC2 and the laser powers P1 and P2 actually output in response to the input voltages.

$$DAC\_Offset=\{(P2 \times DAC1)-(P1 \times DAC2)\}/(P2-P1)$$

Even when the same input voltage is applied, different laser powers may be output according to different characteristics of optical pickups 60 and R/F units 50. Thus, conventionally, in the manufacturing process of optical disc device sets (hereinafter, also referred to as "sets" for short), not only the DAC_Offset value but also an actual laser power P1 output in response to the specific input voltage DAC1 are determined for each set. Conventionally, to obtain the relationship between a specific input voltage and an actual laser power output in response to the specific input voltage, equipment such as a laser power meter 20 and a special tool 30 is used to actually measure the output laser power.

In the manufacturing process of each set, when power curve data required for laser power setting is obtained, i.e., when a DAC_Offset value and a laser power P1 actually output in response to the specific input voltage (DAC1=VRDC) are detected, the obtained power curve data (i.e., the detected DAC_Offset value and the laser power P1) is stored in a memory (a flash ROM or an EEPROM) of the optical disc device. When a laser power is to be set afterwards, a DAC input voltage corresponding to the laser power to be set can be detected using the stored power curve data.

For example, an input voltage (DAC1mW) for setting a playback laser power of 1 mW is detected using an equation $$DAC1\ mW = VRDC\_Offset + (1\ mW/P1) \ast (DAC1 - VRDC\_Offset)".$$

The DAC_Offset value (i.e., the VRDC_Offset value) for setting the playback laser power is detected using the specific input voltage and the corresponding output laser power or the corresponding feedback voltage level as described above. However, a DAC_Offset value (i.e., VWDC_Offset) for setting a recording laser power must be additionally detected and stored when the optical disc device is an optical disc device for recording/playback. When a VWDC_Offset value has been detected and stored in the same method as the VRDC_Offset detection method and a laser power P1 actually output in response to a specific input voltage (DAC1=VWDC) higher than that of the VRDC value has been detected and stored in the laser power setting mode in the manufacturing process, a DAC input voltage corresponding to a recording laser power to be set afterwards can be detected using the stored values.

For example, an input voltage (DAC20mW) for setting a recording laser power of 20 mW is detected using an equation $$DAC20\ mW = VWDC\_Offset + (20\ mW/P1) \ast (DAC1 - VWDC\_Offset)".$$

When power curve data has been detected and stored in the memory in such a manner in the manufacturing process of the optical disc device, the optical disc device can set a desired laser power level for recording or playback based on the stored power curve data afterwards and perform a desired recording or playback operation using the set laser power.

However, no power curve data may be present in a memory in an optical disc device (i.e., a power curve data storage area in the memory may be blank (0xffff)) when the optical disc device is shipped without laser power setting in the manufacturing process due to an operator's mistake, when the memory in which power curve data was stored has been reset or the data in the memory has been deleted, when an erasure or writing operation of the memory has failed, or when the optical disc device or a host connected to the optical disc device is powered off when data is being downloaded to the memory. If no power curve data is present in the memory, disc recognition is difficult and stable playback is also difficult due to inaccurate laser power setting. Recording on the disc readily fails during the recording. Even if recording on the disc is completed, high recording quality is not guaranteed.

Even when power curve data detected in the manufacturing process of the optical disc device is present in the memory, the power curve data may not be suitable due to changes in the characteristics of the optical disc device if much time has passed, thereby making it difficult to perform stable playback and recording operations.

SUMMARY OF THE INVENTION

Therefore, the present invention has been made in view of the above problems, and it is an object of the present invention to provide a method for setting laser power of an optical disc device, wherein the laser power is set to a suitable level for the characteristics of the optical disc device even when power curve data necessary for setting the laser power is not present in the device.

It is another object of the present invention to provide a method for setting laser power of an optical disc device, wherein power curve data necessary for setting the laser power is updated so that the laser power is set to a suitable level for the characteristics of the device.

In accordance with one aspect of the present invention, the above and other objects can be accomplished by the provision of a method for setting laser power of an optical disc device, the method comprising the steps of a) detecting power setting data through a laser power self-setting operation and storing the detected power setting data in a memory; and b) setting the laser power using the stored power setting data.

Preferably, the step a) comprises the steps of detecting a laser power offset; measuring a specific number of parameters for a specific input; and detecting a reference input based on the detected offset, the detected parameters, and coefficients, corresponding to the parameters, stored in a memory, and storing the detected reference input as power setting data.

Preferably, the power setting data includes power setting data for playback and power setting data for recording which are separately detected. Preferably, the coefficients are values which are previously obtained through experiments of a plurality of optical disc devices and a statistical method and then stored in the memory, the coefficients being divided into coefficients for playback and coefficients for recording. Preferably, the offset is an input value that is measured at a moment when laser power output is started while increasing the input level.

Preferably, the step a) comprises the steps of comparing the detected power setting data with power setting data already stored in the memory; and updating the power setting data in the memory with the detected power setting data if both the data are different, and may further comprise the step of repeating the laser power self-setting operation and the comparison operation a predetermined number of times.

Preferably, the step a) is performed, when the power setting data is not present in the memory, each time the memory is updated, each time the optical disc device is powered on, or at specific time intervals. Preferably, the laser power self-setting operation is performed with no optical disc inserted, and the power setting data is stored in a flash ROM.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFFERRED EMBODIMENTS

A method for setting laser power of an optical disc device according to the present invention will now be described in detail with reference to the accompanying drawings.

Figure 1:
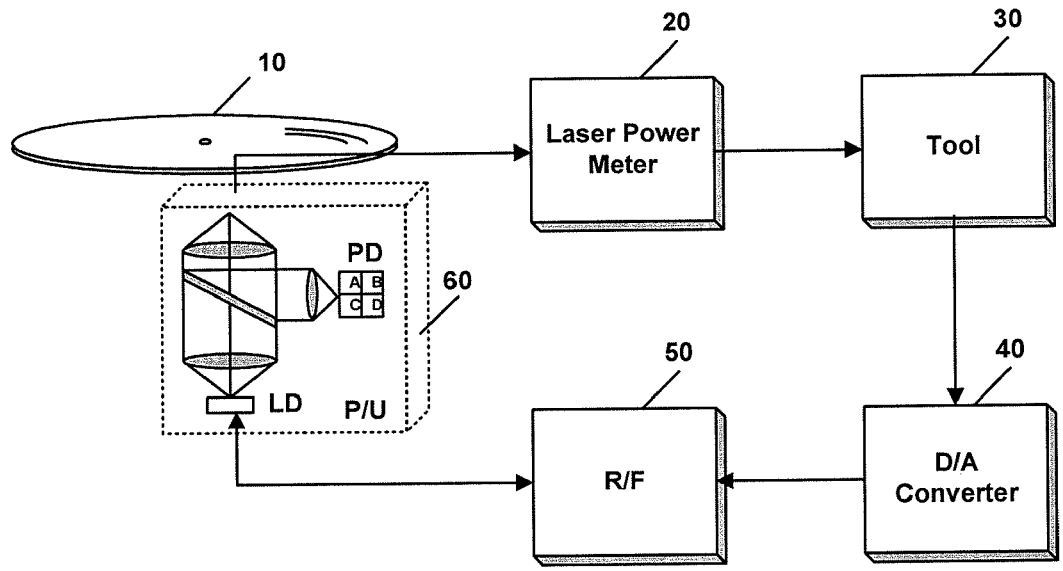
FIG. 1 illustrates a conventional structure, associated with an optical disc device, for detecting power curve data.
Figure 2:
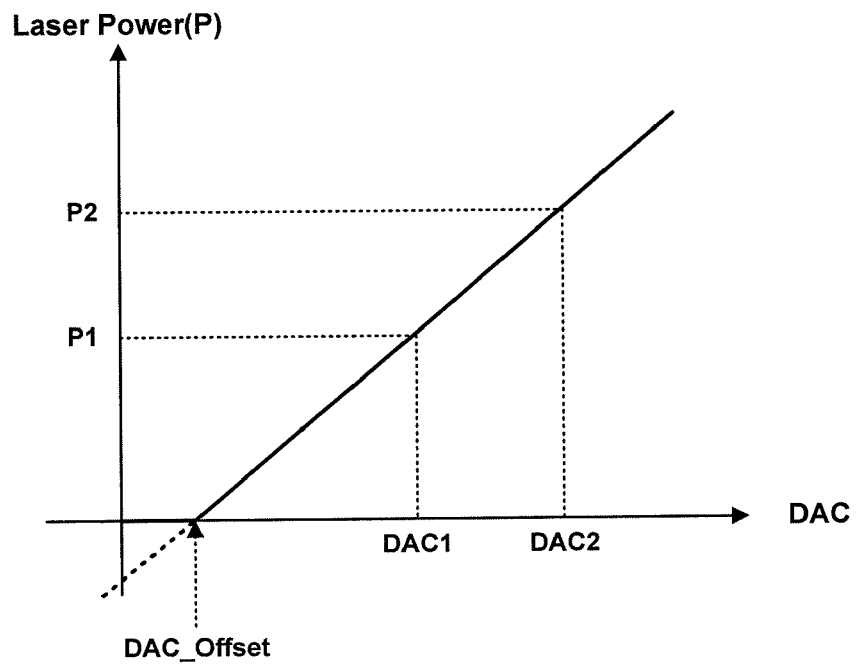
FIG. 2 is a graph illustrating a conventional method for detecting an offset for laser power setting.
Figure 3:
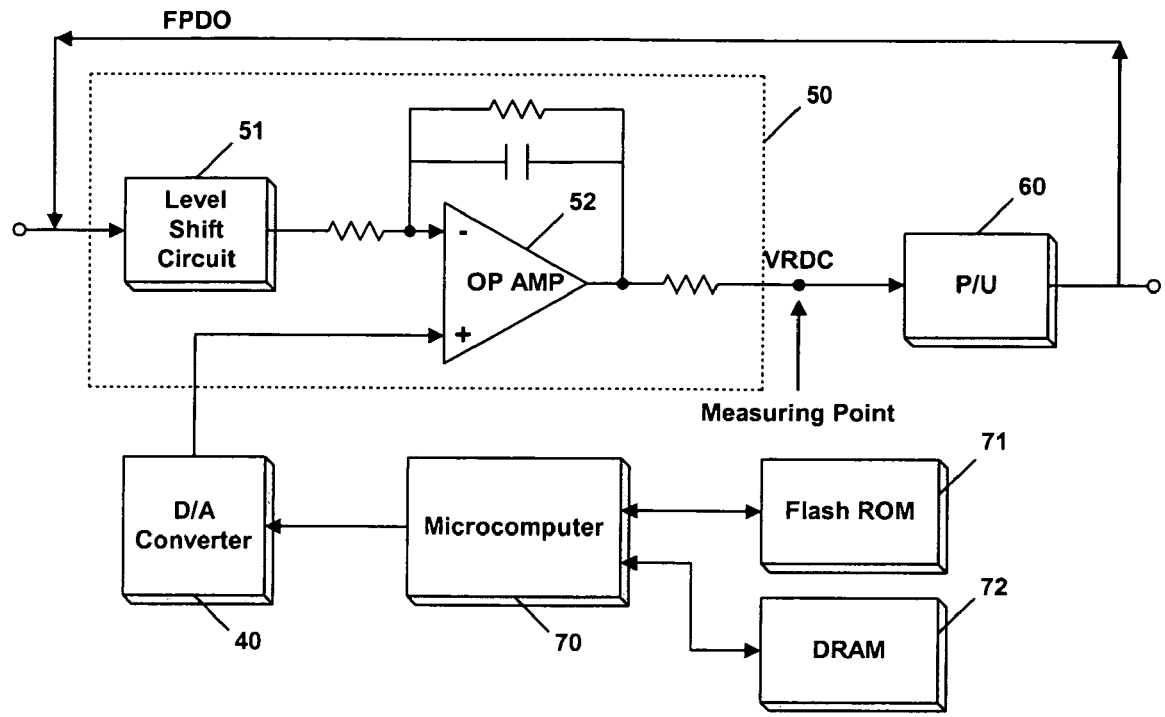
FIG. 3 is a block diagram of an embodiment of an optical disc device for implementing a laser power setting method according to the present invention.

FIG. 3 is a block diagram of an optical disc device for implementing the laser power setting method according to the present invention. The optical disc device comprises an R/F unit 50, an optical pickup 60, a flash ROM 71, a DRAM 72, and a microcomputer 70. The optical pickup 60 records data on an optical disc or reads data from the optical disc with a laser power corresponding to an input voltage. The R/F unit 50 maintains and outputs a desired voltage level through an OP amp 52 based on an input voltage received through a D/A converter 40 and a voltage level FPDO fed back from the optical pickup 60. The flash ROM 71 stores A, B, C, and D coefficients for detecting a reference input voltage Delta_DAC corresponding to a reference laser power and parameters DAC_Offset and Delta_DAC for setting recording and playback laser powers. The DRAM 72 temporarily stores data. The microcomputer 70 detects a DAC_Offset value for setting recording and playback laser powers, detects a reference input voltage Delta_DAC using the detected DAC_Offset value and values stored in the flash ROM 71, and sets a desired laser power level based on the detected reference input voltage Delta_DAC.

Power curve data detected during manufacturing of the optical disc device can be stored in a predetermined area of the flash ROM 71.

Laser powers for playback and recording are set at significantly different levels, for example, around 1 mW and 20 mW as described above, and their operating ranges are separated with each other without any overlapping. This indicates that the range of levels of a voltage input to the R/F unit 50 and the range of levels of a voltage output from the R/F unit 50 for playback are different from those for recording so that no single structure can cover the entire operating range. Accordingly, when the optical disc device is a device capable of playback and recording, the R/F unit 50 is typically constructed in two separate portions for playback and recording.

The A, B, C, and D coefficients stored in the flash ROM 71 of each set are values representing the characteristics of VRDC_ Level, VRDC_FPDO, VWDC_Level, and VWDC_FPDO values of each set, respectively. Specifically, the A coefficient represents the relationship between the DAC value and the VRDC_Level value, the B coefficient represents the relationship between the DAC value and the VRDC_FPDO value, the C coefficient represents the relationship between the DAC value and the VWDC_Level value, and the D coefficient represents the relationship between the DAC value and the VWDC_FPDO value. The A, B, C, and D coefficients of each set are determined at the design stage of each set through a statistical method which employs tests of optical pickups of a number of sets. One set of A, B, C, and D coefficients for setting the playback laser power and another set of A, B, C and D coefficients for setting the recording laser power are separately calculated.

Figure 4:
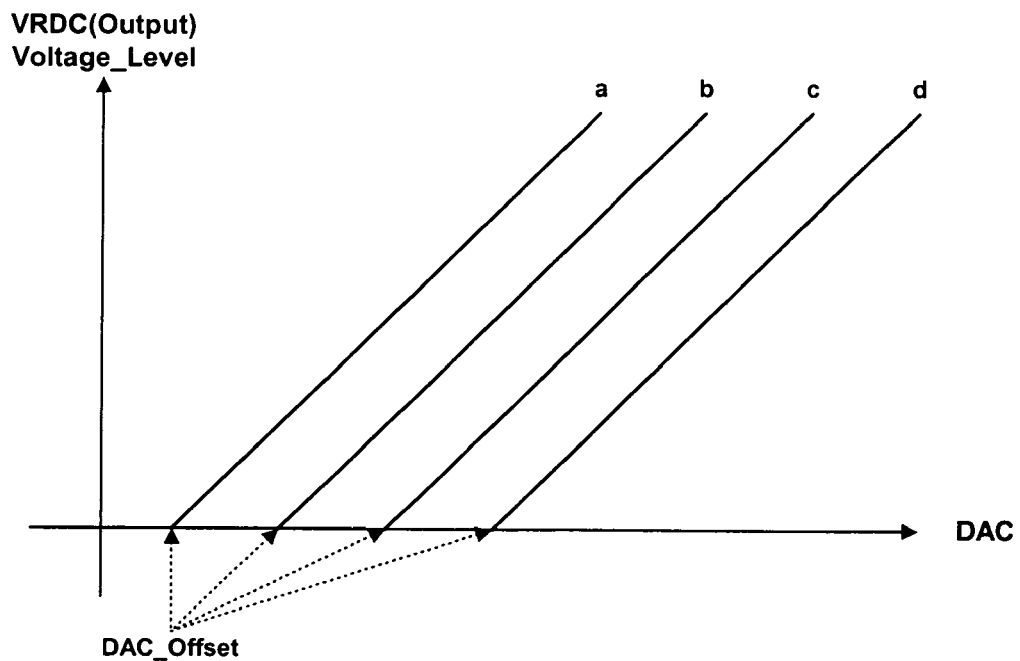
FIG. 4 is a graph showing the relationship between DAC and VRDC_Level values of each optical disc device set.

The following is a description of this method as exemplified by the coefficient A which represents the relationship between the DAC and VRDC_Level values. Since the DAC and VRDC_Level values have a linear relationship, a graph representing the relationship between the DAC and VRDC_Level values with the DAC value on the X axis and the VRDC_Level value on the Y axis is in the form of a line as shown in FIG. 4. The relationships a, b, c, and d between the DAC and VRDC_level values of four sets are expressed by four lines which have almost the same gradient and different offsets as shown in FIG. 4. The relationship between the DAC and VRDC_FPDO values represented by the coefficient B, the relationship between the DAC and VWDC_Level values represented by the coefficient C, and the relationship between the DAC and VWDC_FPDO values represented by the coefficient D are linear as with the relationship between the DAC and VRDC_Level values represented by the coefficient A. While the offset must be detected for each set, the coefficients associated with the gradients of the VRDC_Level, VRDC_FPDO, VWDC_Level, and VWDC_FPDO values may be previously detected and stored through tests of optical pickups of a number of sets and then be used for laser power setting afterwards.

Examples of the coefficients A, B, C, and D obtained through experiments and a statistical method include coefficients A, B, C, and D (A=0.00111, B=0.00391, C=0.0131, and D=0.00654) of the recording laser power and coefficients A, B, C, and D (A=0.00591, B=0.0152, C=0.0388, and D=0.03) of the playback laser power.

When a level shift circuit 51 is provided in the R/F unit 50 as shown in FIG. 3, the output voltage is shifted by a predetermined level through the level shift circuit 51.

Generally, optical disc devices require a variety of laser power levels according to their operating modes such as data recording and playback modes and thus set laser power using power curve data stored in the manufacturing process. The microcomputer 70 performs a laser power self-setting operation according to the present invention if no power curve data has been present from the beginning, since laser power setting was not done in the manufacturing process due to an operator's mistake or if no power curve data is present because the power curve data has been lost for unknown reasons although it was present at the beginning.

Specifically, when no power curve data is present in the flash ROM 71, the microcomputer 70 detects and stores a reference input voltage Delta_DAC of a set corresponding to a reference laser power (for example, 1 mW), and sets a desired laser power level based on the reference input voltage Delta_DAC. The reference input voltage Delta_DAC is an increase in the input voltage from the moment (corresponding to DAC_Offset) when laser power output is started to the moment when a reference laser power is output.

In the present invention, detection of a reference input voltage for playback is based on an equation "VRDC_Delta_DAC=VRDC_Offset+A*VRDC_Level+B*VRDC_FPDO+C*VWDC_Level+D*VWDC_FPDO", and detection of a reference input voltage for recording is based on an equation "VWDC_Delta_DAC =VWDC_Offset+A*VRDC_Level+B*VRDC_FPDO+C*VWDC_Level+D*VWDC_FPDO".

The VRDC_Offset value for playback, the VWDC_Offset value for recording, the VRDC and VWDC levels, and the FPDO values must first be determined in order to detect the reference input voltage. In the present invention, the VRDC and VWDC levels and the FPDO values are detected in laser power self-setting mode and is then stored in the flash ROM 71 although they can also be detected in the manufacturing process of the set and then be stored in the flash ROM 71.

Figure 5:
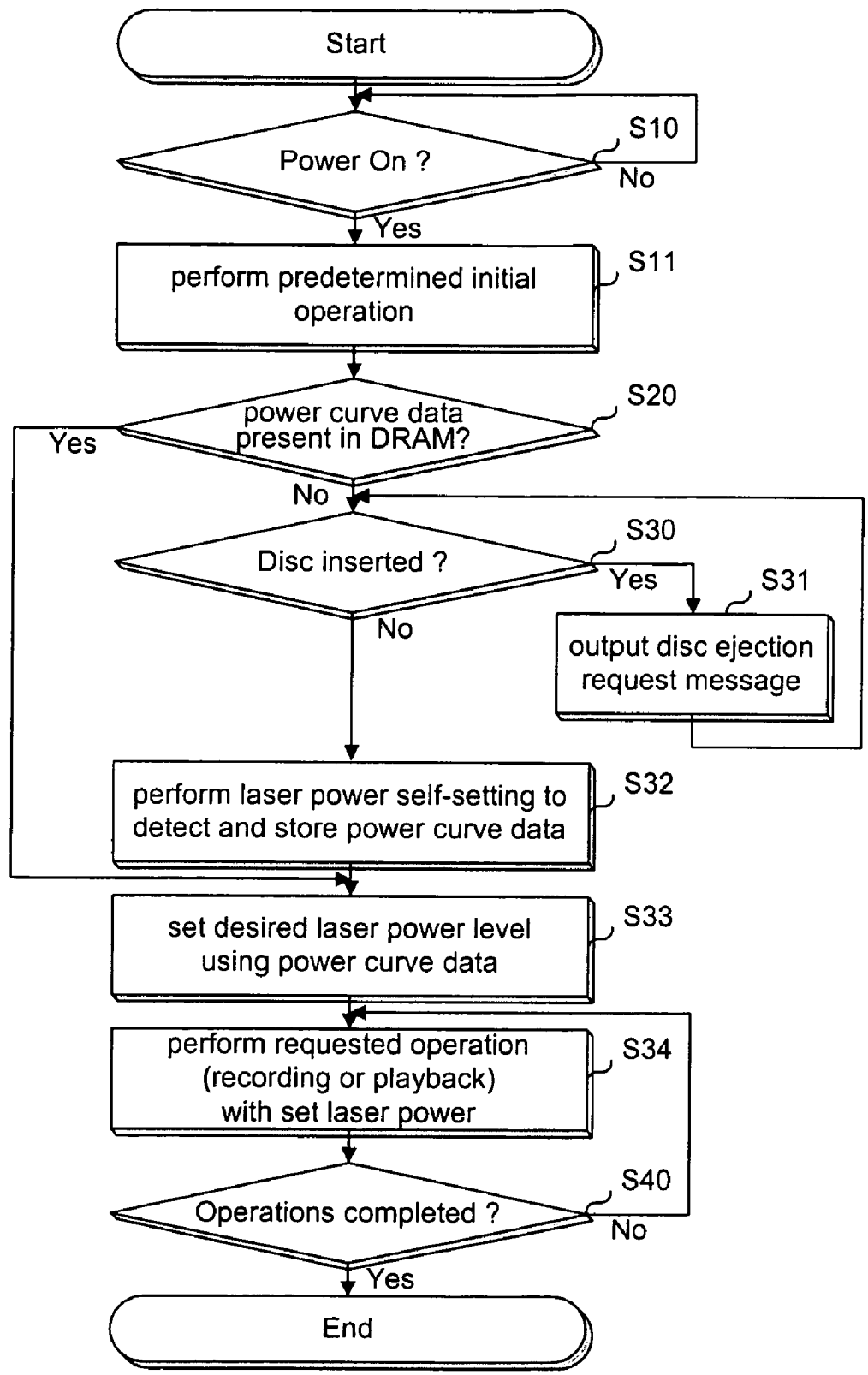
FIG. 5 is a flow chart of a preferred embodiment of a laser power setting method for an optical disc device according to the present invention.

FIG. 5 is a flow chart of a preferred embodiment of a laser power setting method for an optical disc device according to the present invention. The laser power setting method of FIG. 5 according to the present invention will now be described in detail with reference to the optical disc device of FIG. 3.

When the optical disc device is powered on (S10), the microcomputer 70 performs a predetermined initial operation (S11). Specifically, when the microcomputer 70 becomes alive, the microcomputer 70 accesses the flash ROM 71, reads data from the flash ROM 71, and temporarily stores the read data in the DRAM 72, which is a volatile memory.

Generally, power curve data detected in the manufacturing process of the optical disc device is stored in the flash ROM 71. The power curve data may not be stored in the flash ROM 71 due to the operator's mistake or no power curve data may be present due to loss of the power curve data although it was stored. In this case, no power curve data is stored in the DRAM 72 in the initial operation.

Accordingly, when the initial operation is completed, the microcomputer 70 first determines whether or not power curve data is present in the DRAM 72 (S20). If power curve data is present in the DRAM 72, the microcomputer 70 can set a desired laser power level based on the stored power curve data afterwards (S33) and thus does not perform the laser power self-setting operation according to the present invention.

When it is determined that no power curve data is present in the DRAM 72, specifically, when a power curve data storage area in the DRAM 72 is blank (0xffff), the microcomputer 70 performs the laser power self-setting operation according to the present invention in the following manner.

When the laser power self-setting mode is set, the microcomputer 70 first determines whether or not an optical disc has been inserted (S30) since performing the laser power self-setting operation with an optical disc inserted may damage the inserted disc.

If a disc has been inserted, the microcomputer 70 outputs a warning message requesting ejection of the disc for laser power self-setting (S31), so-that the disc is first ejected.

If no disc has been inserted, the microcomputer 70 detects VRDC_Offset and VWDC_Offset values. Since methods for detecting the VRDC_Offset and VWDC_Offset values are similar, only the VRDC_Offset detection method is described in detail in the following description of the present invention.

Figure 6:
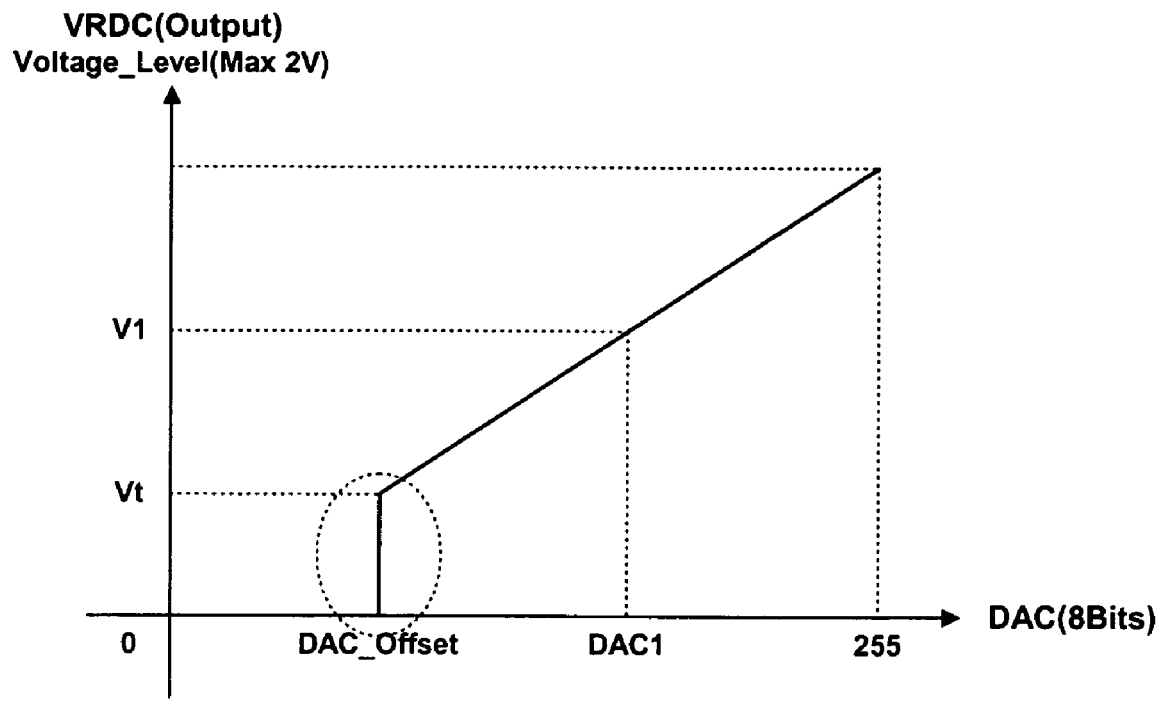
FIG. 6 is a graph showing an output voltage locus for detecting an offset for laser power setting according to the present invention.

The level shift circuit 51 shifts an output voltage at an offset point by a specific voltage level Vt in order to stabilize the output voltage level. As shown in FIG. 6, the voltage at the offset point is momently increased by the voltage level Vt determined by the level shift circuit 51.

If the shift level by the level shift circuit 51 is, for example, 0.5V, the DAC_Offset value at the moment when the output voltage level reaches 0.5V is 64 when an ideal R/F unit 50 is employed. However, in actual circuits, the DAC_Offset value varies due to factors changing the output voltage level.

Accordingly, the microcomputer 70 measures the output voltage level of the R/F unit 50 at an output terminal (a measuring point) of the R/F unit 50 while gradually varying the DAC value applied to the D/A converter 40 from a low level to a high level. Specifically, the microcomputer 70 measures the output voltage level of the R/F unit 50 while gradually increasing the DAC value, for example, from "5" to "125" with reference to an ideal DAC_Offset value "64".

At the moment when the DAC value reaches a predetermined value so that the R/F unit 50 produces an output voltage, the microcomputer 70 stores the DAC value applied to the D/A converter 40, as a DAC_Offset value for playback (i.e., a VRDC_Offset value), in the flash ROM 71.

For a portion for recording of the R/F unit 50, the microcomputer 70 also detects and stores a VWDC_Offset value in the flash ROM 71 using the same method as described above.

The microcomputer 70 detects VRDC and VWDC levels and FPDO values for a portion for playback of the R/F unit 50. To accomplish this, the microcomputer 70 causes a specific VRDC value (DAC=150) to be applied to the optical pickup 60 via the D/A converter 40 and the R/F unit 50, and then detects the level of the VRDC value (VRDC_Level) and the level of a voltage (VRDC_FPDO) fed back from the optical pickup 60 receiving the VRDC value and stores the detected VRDC and VRDC_FPDO levels in the flash ROM 71.

In addition, the microcomputer 70 causes a specific VWDC value (DAC=400) to be applied to the optical pickup 60 via the D/A converter 40 and the R/F unit 50, and then detects the level of the VWDC value (VWDC_Level) and the level of a voltage (VWDC_FPDO) fed back from the optical pickup 60 receiving the VWDC value and stores the detected VWDC and VWDC_FPDO levels in the flash ROM 71.

Once the values necessary for detection of the VRDC_Delta_DAC value are detected and stored, the microcomputer 70 detects the VRDC_Delta_DAC value using the VRDC_Delta_DAC detection equation, and stores the detected VRDC_Delta_DAC value, as power curve data, in the flash ROM 71.

Similarly, the microcomputer 70 detects VRDC and VWDC levels and FPDO values for the portion for recording of the R/F unit 50, detects the VWDC_Delta_DAC value using the VWDC_Delta_DAC detection equation, and stores the detected VWDC_Delta_DAC value, as power curve data, in the flash ROM 71. Here, the VRDC and VWDC values (DAC values) applied to the optical pickup 60 to detect the VRDC and VWDC levels and the FPDO values may be different between the playback portion and the recording portion of the R/F unit 50.

When recording or playback is requested afterwards, the microcomputer 70 sets a desired laser power level using the stored power curve data. Since the detected reference input voltage corresponds to a reference laser power, the microcomputer 70 detects a VRDC or VWDC input voltage corresponding to a desired laser power level by adding ±α to the VRDC_Delta_DAC or VWDC_Delta_DAC value (i.e., VRDC_Delta_DAC±α or VWDC_Delta_DAC±α) so that it can set the desired laser power level.

The value α varies depending on the characteristics of the set and may be equal for sets of the same model.

Figure 7:
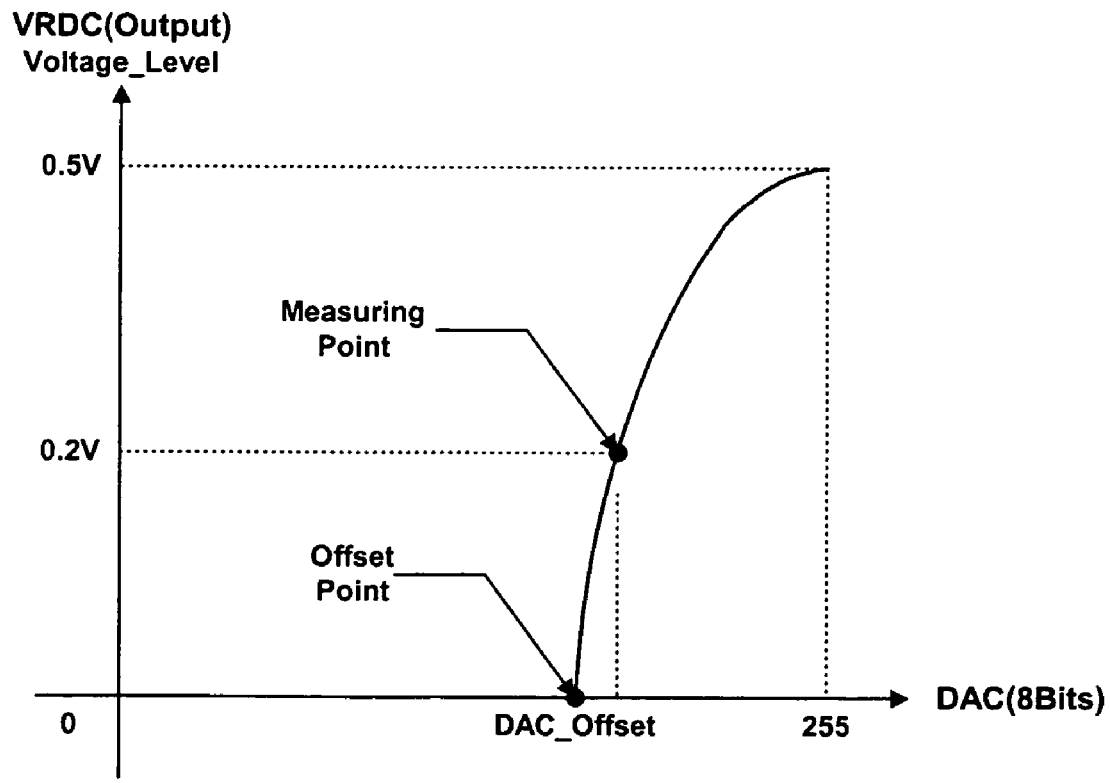
FIG. 7 is a graph showing an output voltage locus in a transition area in the output voltage graph shown in FIG. 6.

FIG. 7 is a graph showing an output voltage locus in a transition area in the output voltage graph shown in FIG. 6. The VRDC_Offset value can be obtained by measuring a DAC value (DACtmp value) at the moment when the output voltage level reaches, for example, 0.2V out of the unstable area, and subtracting a specific DAC value (preferably, 1 or 2) from the DACtmp value.

More specifically, in the laser power self-setting mode, the microcomputer 70 applies a DAC value to the D/A converter 40 while gradually increasing the DAC value, for example, from "5" to "125" in order to detect the VRDC_Offset value.

As the gradually increasing DAC value is applied, the voltage level at the output terminal of the R/F unit 50 initially remains at the level "0" and sharply increases in the transition area as shown in FIG. 7. In this transition area, the microcomputer 70 finds the moment when the voltage level at the output terminal of the R/F unit 50 reaches 0.2V, using a multiplexer, and obtains the DAC (DACtmp) value at that moment.

The microcomputer 70 subtracts, for example, "2" from the obtained DACtmp value and stores the resulting value, as a VRDC_Offset value, in the flash ROM 71. The microcomputer 70 detects and stores the VWDC_Offset value in the same manner as the VRDC_Offset detection method.

The following is a description of a method for measuring the DACtmp value. For example, a multiplexer including a 10-bit DAC is used to find the moment when the level of a voltage produced at the output terminal of the R/F unit 50 reaches 0.2V. The fact that the 10-bit DAC value is, for example, "2557" at the moment when the voltage of the output terminal reaches 0.2V can be obtained from actual measurements. Thus, a DAC value applied to the D/A converter 40 at the moment when the 10-bit DAC value reaches "2557" is confirmed while gradually increasing the 10-bit DAC value from "0" to "2557". The confirmed DAC value is determined to be the DACtmp value. The DAC_Offset value can be obtained by subtracting, for example, 2 from the DACtmp value.

The determination as to whether or not power curve data is present and the laser power self-setting operation depending on the determination can be performed not only when the device is powered on but also periodically or at specific time intervals.

In the above embodiment, the microcomputer 70 can perform the laser power self-setting operation even when power curve data is present in the DRAM 71. When it is determined that power curve data is present in the DRAM 72, the microcomputer 70 performs the laser power self-setting operation at specific time intervals, compares power curve data detected through the laser power self-setting operation with power curve data already stored in the DRAM 72, and repeats the laser power self-setting operation and the comparison operation a predetermined number of times (for example, N times) when both the data are different.

If both the data are different even when the laser power self-setting and comparison operations have been repeated the predetermined number of times, the microcomputer 70 records an average of data values detected at the specific time intervals or a last detected data value, as a new power curve data value, in the power curve data storage area of the flash ROM 71, thereby updating the power curve data in the flash ROM 71.

Although the microcomputer 70 can update the power curve data through the comparison operation when the power curve data is present in the DRAM 72 as described above, the microcomputer 70 can also update the power curve data in the DRAM 72 with power curve data detected through the laser power self-setting operation performed at the specific time intervals without the comparison operation.

Regardless of whether or not the power curve data is present in the DRAM 72, the microcomputer 70 may perform the laser power self-setting operation at specific time intervals and then store power curve data detected through the laser power self-setting operation in the power curve data storage area of the flash ROM 71 or update the power curve data in the flash ROM 71 with the detected power curve data.

In addition, regardless of whether or not the power curve data is present in the DRAM 72, the microcomputer 70 may perform the laser power self-setting operation each time the initial operation is performed and then store power curve data detected through the laser power self-setting operation in the power curve data storage area of the flash ROM 71 or update the power curve data in the flash ROM 71 with the detected power curve data.

Further, regardless of whether or not the power curve data is present in the DRAM 72, the microcomputer 70 may perform the laser power self-setting operation each time the microcomputer 70 updates the flash ROM 71 and then store power curve data detected through the laser power self-setting operation in the power curve data storage area of the flash ROM 71 or update the power curve data in the flash ROM 71 with the detected power curve data.

In any case described above, the laser power self-setting operation is performed with no optical disc inserted as described above.

As is apparent from the above description, in a method for setting laser power of an optical disc device according to the present invention, even if no power curve data is present for a variety of reasons, it is possible to set an optimal laser power suitable for the characteristics of the set (i.e., the optical disc device) and also to maintain latest power curve data according to the characteristics of the set, whereby optimal laser power can always be set regardless of changes in the characteristics of the set and it is also possible to secure a stable playback operation and guarantee high recording quality through the optimal laser power setting.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for setting laser power of an optical disc device, the method comprising the steps of:
   determining whether or not an optical disc has been inserted into the optical disc device;
   outputting a warning message requesting ejection of the optical disc from the optical disc device if the optical disc is determined to have been inserted;
   if the disc is determined not to have been inserted, detecting power setting data through a laser power self-setting operation and storing the detected power setting data in a memory; and
   setting the laser power using the stored power setting data, wherein the laser power self-setting operation includes shifting an output voltage at an offset point by a specific voltage level.

2. The method according to claim 1, wherein the step of detecting power setting data comprises the steps of:
   detecting a laser power offset;
   measuring a specific number of parameters for a specific input; and
   detecting a reference input based on the detected offset, the detected parameters, and coefficients, corresponding to the parameters, stored in a memory, and storing the detected reference input as power setting data.

3. The method according to claim 2, wherein the power setting data includes power setting data for playback and power setting data for recording which are separately detected.

4. The method according to claim 3, wherein the coefficients are values which are previously obtained through experiments of a plurality of optical disc devices and a statistical method and then stored in the memory, the coefficients being divided into coefficients for playback and coefficients for recording.

5. The method according to claim 2, wherein the offset is an input value that is measured at a moment when laser power output is started while increasing the input level.

6. The method according to claim 1, wherein the step of detecting power setting data is performed if the power setting data is not present in the memory.

7. The method according to claim 1, wherein the laser power self-setting operation is performed with no optical disc inserted.

8. The method according to claim 1, wherein the power setting data is stored in a flash ROM.

9. The method according to claim 1, wherein the step of detecting power setting data comprises the steps of:
   comparing the detected power setting data with power setting data already stored in the memory; and
   updating the power setting data in the memory with the detected power setting data if both the data are different.

10. The method according to claim 9, wherein the step of detecting power setting data further comprises the steps of:
    repeating the laser power self-setting operation and the comparison operation a predetermined number of times.

11. The method according to claim 1, wherein the step of detecting power setting data is performed each time the optical disc device is powered on.

12. The method according to claim 9, wherein the step of detecting power setting data is performed each time the optical disc device is powered on.

13. The method according to claim 10, wherein the step of detecting power setting data is performed each time the optical disc device is powered on.

14. The method according to claim 1, wherein the step of detecting power setting data is performed at specific time intervals.

15. The method according to claim 9, wherein the step of detecting power setting data is performed at specific time intervals.

16. The method according to claim 10, wherein the step of detecting power setting data is performed at specific time intervals.

17. The method according to claim 10, wherein the step of detecting power setting data is performed each time the memory is updated.

* * * * *